(12) United States Patent
Park et al.

(10) Patent No.: US 11,645,951 B2
(45) Date of Patent: May 9, 2023

(54) ARTIFICIAL ORGAN MODEL FOR TRAINING FOR SURGICAL TECHNIQUE, METHOD FOR MANUFACTURING ARTIFICIAL ORGAN MODEL, AND METHOD FOR TRAINING FOR SURGICAL TECHNIQUE USING ARTIFICIAL ORGAN MODEL

(71) Applicant: EBM CORPORATION, Tokyo (JP)

(72) Inventors: Young-Kwang Park, Tokyo (JP); Manabu Shinke, Tokyo (JP); Masaaki Ito, Tokyo (JP)

(73) Assignee: EBM CORPORATION, Tokyo (JP)

( * ) Notice: Subject to any disclaimer, the term of this patent is extended or adjusted under 35 U.S.C. 154(b) by 46 days.

(21) Appl. No.: 17/253,347

(22) PCT Filed: Apr. 1, 2019

(86) PCT No.: PCT/JP2019/014532
§ 371 (c)(1),
(2) Date: Dec. 17, 2020

(87) PCT Pub. No.: WO2019/244436
PCT Pub. Date: Dec. 26, 2019

(65) Prior Publication Data
US 2021/0295743 A1  Sep. 23, 2021

(30) Foreign Application Priority Data

Jun. 19, 2018  (JP) .............................. JP2018-115853
Feb. 8, 2019  (JP) .............................. JP2019-021676
Apr. 1, 2019  (JP) .............................. JP2019-069815

(51) Int. Cl.
*G09B 23/34* (2006.01)
*G09B 23/30* (2006.01)
(Continued)

(52) U.S. Cl.
CPC .............. *G09B 23/34* (2013.01); *B29C 65/48* (2013.01); *B29C 66/45* (2013.01); *B29C 66/729* (2013.01);
(Continued)

(58) Field of Classification Search
CPC ....... G09B 23/34; G09B 23/306; G09B 23/30; B29C 65/48; B29C 66/45; B29C 66/729; B29L 2031/40
See application file for complete search history.

(56) References Cited

U.S. PATENT DOCUMENTS 2,541,761 A * 2/1951 Harrison ............. B29C 65/4815
 36/77 R
6,258,996 B1 * 7/2001 Goldman ............. C08L 101/14
 604/367

(Continued)

FOREIGN PATENT DOCUMENTS

JP 2016-6477 A 1/2016

*Primary Examiner* — Francisco W Tschen
*Assistant Examiner* — Abhishek A Patwardhan
(74) *Attorney, Agent, or Firm* — Taro Yaguchi

(57) ABSTRACT

[Problem to be Solved by the Invention]
To provide an artificial tissue model that can be more advantageously used in surgical technique training compared to previous artificial tissues, as well as a method of fabricating the same.
[Solution]
An artificial organ model for surgical technique training comprising two or more fibrous layers 2, 3 layered and bonded to each other so as to be peelable by a surgical technique performed by a surgical technique trainee; the layered and bonded two or more fibrous layers 2, 3 as a whole being saturated with an electroconductive liquid or gel; and two adjacent fibrous layers out of the two or more fibrous layers being formed from different materials or
(Continued)

substances or in different colors so as to be recognizable as different membranes by the surgical technique trainee.

11 Claims, 13 Drawing Sheets

(51) Int. Cl.
  *B29C 65/00* (2006.01)
  *B29C 65/48* (2006.01)
  *B29L 31/40* (2006.01)
(52) U.S. Cl.
  CPC ........ *G09B 23/306* (2013.01); *B29L 2031/40* (2013.01)

(56) References Cited

U.S. PATENT DOCUMENTS

| | | | |
|---|---|---|---|
| 2005/0067007 A1* | 3/2005 | Toft | H01G 9/2095 |
| | | | 136/244 |
| 2016/0273161 A1* | 9/2016 | Ho | D07B 1/147 |
| 2017/0009592 A1* | 1/2017 | Obuchi | F01D 5/147 |
| 2017/0186340 A1* | 6/2017 | Ogawa | B32B 5/32 |
| 2017/0297295 A1* | 10/2017 | Bhatnagar | B32B 5/022 |

* cited by examiner

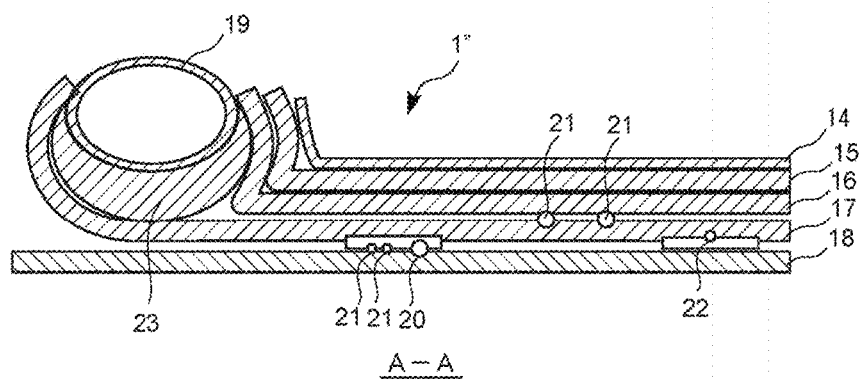
FIG. 15
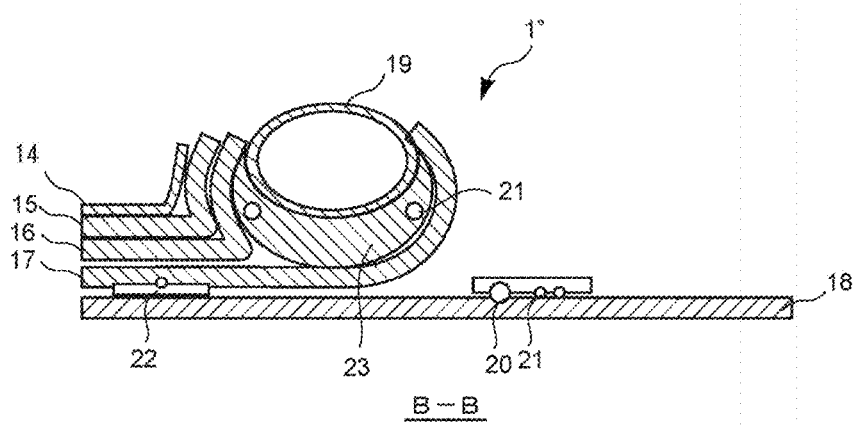
FIG. 16
Peel strength measurement results
| Sample name | A | B | C |
|---|---|---|---|
| Sample condition: adhesive interlining | + | + | − |
| Sample condition: electroconductive viscous liquid | − | + | − |
| Peel strength (N) | 0.911 | 0.559 | 3.217 |
| Standard deviation | 0.146 | 0.158 | 0.290 |
| Range: maximum−minimum (N) | 0.451 | 0.518 | 0.969 |
FIG. 17

Graph 1: Peel strength comparison

ARTIFICIAL ORGAN MODEL FOR TRAINING FOR SURGICAL TECHNIQUE, METHOD FOR MANUFACTURING ARTIFICIAL ORGAN MODEL, AND METHOD FOR TRAINING FOR SURGICAL TECHNIQUE USING ARTIFICIAL ORGAN MODEL

FIELD OF THE INVENTION

The present invention pertains to an artificial organ model for surgical technique training, a method of fabricating said artificial organ model, and a surgical technique training method using said artificial organ model.

BACKGROUND OF THE INVENTION

Using surgical procedures that demand high levels of surgical skill, such as heart surgery, as an example, about 50,000 surgical procedures are performed annually in Japan. However, because these procedures are divided among a large number of hospitals (about 500) and a large number of heart surgeons, in practice the number of operations actually performed by any one surgeon is limited.

In addition, it has been said that the difficulty of cases has been increasing from year to year due to increasing patient age, an increase in repeat surgeries, the spread of off-pump bypass procedures, cases in which there are limited sites for anastomosis following stent insertion, and so forth, resulting in fewer opportunities for young heart surgeons to operate.

In order to compensate for this reduction in surgical experience, procedural training has hitherto been performed using internal organs of animals such as pigs, or artificial organs.

Previously, models made of silicone, urethane elastomer, styrene elastomer, polyvinyl alcohol (PVA), and the like have been proposed for artificial organ models.

Of these, models made of polyvinyl alcohol (PVA) in gel form with model organs such as blood vessels sealed inside are comparatively advantageous, as they feel similar to actual human tissue when incised, despite being artificial.

SUMMARY OF THE INVENTION

Problem to be Solved by the Invention

However, the existing artificial organ models described above continue to be inadequate in imitating actual organs; thus, there is a demand for the development of artificial tissue that is better suited for training in surgical techniques.

The present invention was conceived in view of these circumstances, and has an object of providing an artificial tissue model that can be more advantageously used in surgical technique training compared to previous artificial tissues, as well as a method of fabricating the same.

Means for Solving the Problem

As the result of trial and error in order to improve the ability, during surgical technique training, to imitate the experience of incising actual human organs, the inventors made discoveries regarding an artificial organ model that is highly capable of imitating organ membrane dissection, and engaged in dedicated development to produce actual prototypes, thereby arriving at the present invention.

Specifically, according to a main aspect of the present invention, it is possible to obtain (1) an artificial organ model for surgical technique training; the model being characterized in that: the model comprises a fibrous structure formed by two or more fibrous layers bonded to and layered upon each other at a level of strength such that the layers can be separated by a surgical technique trainee; and, after the two or more fibrous layers have been bonded to each other at the abovementioned level of strength, the fibrous structure as a whole is saturated with an electroconductive liquid, liquid sol, or liquid gel.

Such an arrangement makes it possible to imitate membrane structures in the human body by layering and bonding fibrous layers, and, through the subsequent impartation of wetness and electrical conductivity through the electroconductive liquid/gel, to realize simulations of techniques of separation using an electric scalpel or the like. In other words, processes such as separation, incision, cauterization, and coagulation using an electric scalpel can be realized by applying surgically appropriate traction and countertraction. Organs and structures that are the focus of surgical technique training, such as ureters, blood vessels, intestines, and nerves, can also be properly situated. The electroconductive liquid, or liquid sol or gel, is preferably an aqueous electrolyte solution having a viscosity of 1 cP or more, a fluid hydrogel, a hydrosol, albumen, a mixed solution of albumen and an aqueous electrolyte solution, or the like.

It is preferable that the artificial organ model according to this first aspect be embodied as follows.

(2) The artificial organ model for surgical technique training according to (1), wherein two adjacent fibrous layers out of the two or more fibrous layers are formed from different materials or substances or in different colors so as to be recognizable as different membranes by the surgical technique trainee.

(3) The artificial organ model for surgical technique training according to (1), wherein a model organ for surgical technique training is disposed between two selected fibrous layers out of the two or more fibrous layers.

(4) The artificial organ model for surgical technique training according to (3), wherein the model organ is an artificial model organ formed from an artificial material.

(5) The artificial organ model for surgical technique training according to (3), wherein the model organ has been harvested from an animal.

(6) The artificial organ model for surgical technique training according to (3), wherein the model organ is one or more of a ureter, a blood vessel, an intestine, or a nerve.

(7) The artificial organ model for surgical technique training according to (1), wherein the fibrous layers are bonded to each other using thermoplastic resin.

(8) The artificial organ model for surgical technique training according to (1), wherein the fibrous layers are bonded to each other by an adhesive layer formed from a porous material.

(9) The artificial organ model for surgical technique training according to (8), wherein the adhesive layer is an adhesive interlining.

(10) The artificial organ model for surgical technique training according to (9), wherein two or more of the adhesive interlining are used according to the required peel strength.

(11) The artificial organ model for surgical technique training according to (1), wherein the artificial organ model is bonded to a surface of a predetermined model organ.

(12) The artificial organ model for surgical technique training according to (1), wherein the electroconductive liquid or gel has a viscosity of 50,000 cP or less.

(13) The artificial organ model for surgical technique training according to (12), wherein the electroconductive liquid or gel has a viscosity of 140 cP to 20,000 cP.

(14) The artificial organ model for surgical technique training according to (12), wherein the electroconductive liquid or gel has a viscosity of 900 cP to 5,000 cP.

(15) The artificial organ model for surgical technique training according to (1), wherein the electroconductive liquid or gel is colorless and transparent.

(16) The artificial organ model for surgical technique training according to (1), wherein the fibrous structure is sealed in after the whole has been saturated with the electroconductive liquid or gel.

(17)

A method of fabricating an artificial organ model for surgical technique training, the method being characterized by comprising:

a step of preparing two or more fibrous layers;

a step of layering the two or more fibrous layers and bonding the layers to each other; and a step of supplying an electroconductive liquid or gel to the bonded two or more fibrous layers, and saturating the layers therewith.

(18) The fabrication method according to (17), wherein, in the bonding step, the two or more fibrous layers are bonded to each other at a level of strength enabling separation thereof by a surgical technique performed by a surgical technique trainee.

(19) The fabrication method according to (17), further comprising a step of forming two adjacent fibrous layers out of the two or more fibrous layers from different materials or substances or in different colors so as to be recognizable as different membranes by the surgical technique trainee.

(20) The fabrication method according to (17), wherein the step of layering the two or more fibrous layers and bonding the layers to each other comprises:

a step of interposing a sheet-like adhesive layer between the two or more fibrous layers when layering the fibrous layers; and a step of heating the layered two or more fibrous layers to bond the fibrous layers to each other.

(21) The fabrication method according to (17), further comprising a step of disposing a model organ for surgical technique training between two selected fibrous layers out of the two or more fibrous layers.

(22) The fabrication method according to (21), wherein the model organ is an artificial model organ formed from an artificial material.

(23) The fabrication method according to (21), wherein the model organ has been harvested from an animal.

(24) The fabrication method according to (21), wherein the model organ is one or more of a ureter, a blood vessel, an intestine, or a nerve.

(25) The fabrication method according to (17), wherein the fibrous layers are bonded to each other using thermoplastic resin.

(26) The fabrication method according to (17), wherein the bonding of the fibrous layers is performed by layering and using a selected one or multiple thin-film sheets impregnated or coated with the thermoplastic resin or adhesive.

(27) The fabrication method according to (17), further comprising a step of bonding the artificial organ model to a surface of a predetermined model organ.

(28) The fabrication method according to (17), further comprising a step of sealing in the fibrous layers that have been wetted with the electroconductive liquid or gel.

(29) A surgical technique training method utilizing an artificial organ model, characterized in that:

the artificial organ model comprises a fibrous structure formed by layering and bonding to each other two or more fibrous layers at a level of strength that allows separation thereof by a surgical technique performed by a surgical technique trainee;

the fibrous structure is formed by bonding the two or more fibrous layers to each other at the abovementioned level of strength, followed by saturating the whole with an electroconductive liquid or liquid gel; and the surgical technique training method comprises:

a step of lifting up and applying traction (countertraction) to a superficial layer out of the two or more fibrous layers using tweezers; and a step of using an electric scalpel or harmonic scalpel to incise the lifted-up fibrous layer, and separate and the same from the underlying fibrous layer.

(30) The training method according to (28), wherein:

a model organ for surgical technique training is disposed between two selected fibrous layers out of the two or more fibrous layers of the artificial organ model; and the training method further comprises a step of harvesting the model organ.

Other characteristics of the present invention will be made apparent in the following embodiments and drawings.

BRIEF DESCRIPTION OF THE DRAWINGS

FIG. 15 shows a view along A-A in FIG. 14.

FIG. 16 shows a view along B-B in FIG. 14.

FIG. 17 is a table of peel strength measurement results.

DETAILED DESCRIPTION OF THE INVENTION

An embodiment of the present invention will be described below with reference to the drawings.

First Embodiment (Configuration)

Figure 1:
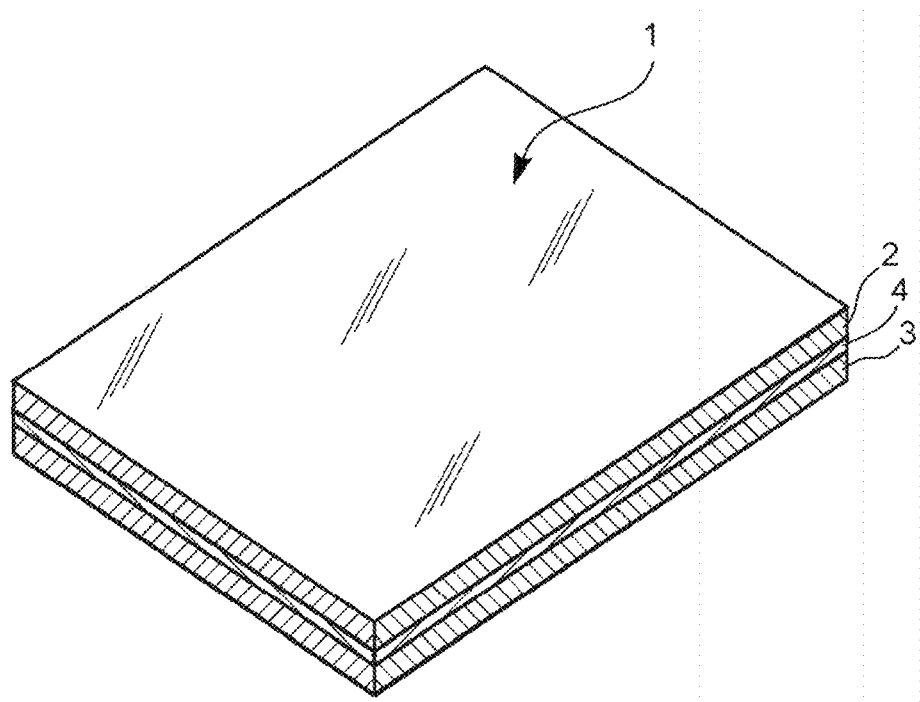
FIG. 1 is a schematic illustration of the configuration of an artificial organ model according to a first embodiment of the present invention.
Figure 2:
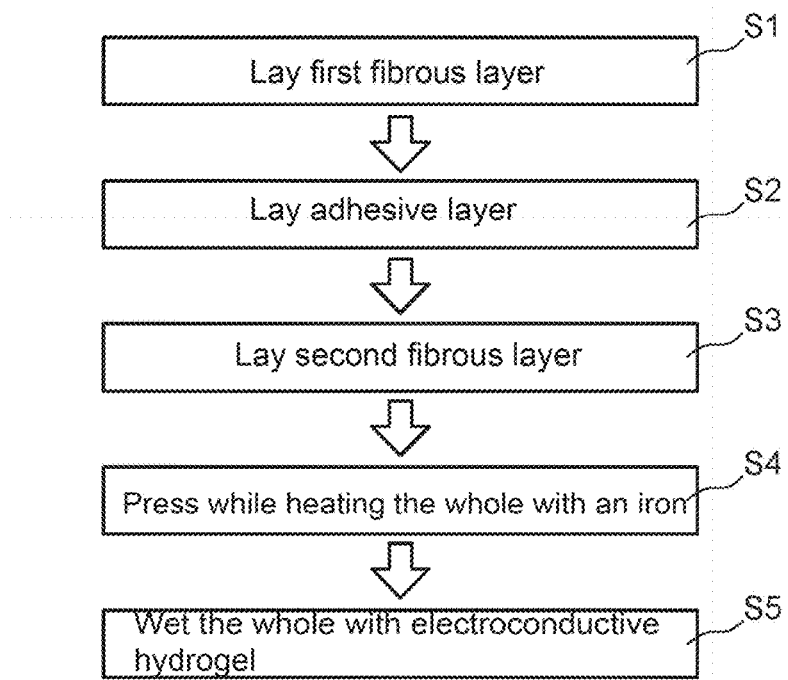
FIG. 2 is a schematic diagram of a process of fabricating the artificial organ model.

FIG. 1 is a perspective view of an artificial organ model 1 (basic model) having the most basic form of the present invention, and FIG. 2 is a schematic diagram of a process of fabricating the same.

The artificial organ model 1 has a two-layered structure comprising first and second fibrous layers 2, 3 with an adhesive layer 4 being provided between the first and second fibrous layers 2, 3, and the first and second fibrous layers 2, 3 being peelably bonded by the adhesive layer 4.

The fibrous layers 2, 3 are woven or nonwoven fabric of natural or synthetic fibers, and are configured so that the lengthwise direction of the fibers extends substantially in the planar direction of the respective layers. The fibrous layers 2, 3 respectively model different organs (skin or fat layers, blood vessels, etc.), and are colored different colors or formed from fibers of different materials or substances to allow a user to easily recognize the boundary between the fibrous layers 2, 3.

The adhesive layer 4 is a thin sheet-like fiber material containing or impregnated with a prescribed adhesive, or coated on one or both sides therewith. The adhesive layer is formed from a porous material, preferably an adhesive interlining, to allow the electroconductive gel with which the artificial organ model is subsequently impregnated to penetrate in the through-thickness direction thereof. One or multiple adhesive layers 4 can be used according to the peel strength required between the first and second fibrous layers.

In the present embodiment, as shown in FIG. 2, the adhesive layer 4 is layered and sandwiched between the first and second fibrous layers 2, 3 in the through-thickness direction (steps S1-S3), then compressed and heated using an iron or the like, and subsequently cooled to bond the first and second fibrous layers 2, 3 to each other (step S4). Next, the artificial organ model 1 is completed by being wetted with the electroconductive viscous liquid (step S5).

In products implemented by EBM Corp., a fiber structure is colored to make the fibrous layers visible and the boundaries between layers explicit. Accordingly, the electroconductive viscous liquid (or simply liquid) is merely a fluid liquid, and must be colorless or transparent (translucent) so as not to impede identification of the fibrous layers.

(Function of Adhesive Layer in the Present Invention)

In the present invention, the basic structure of the model 1 is constructed by bonding the first and second fibrous layers 2, 3 using the adhesive layer 4, specifically, an adhesive interlining. This is a major point of difference from conventional models using PVA, in which the PVA itself forms part of the basic structure.

The adhesive interlining 4 is used as a boundary layer between the fibrous layers 2, 3 to impart a desired level of peel strength thereto. As a result, it is possible to plan the peel strength of the fiber structure of multiple layers of fibers in dissection technique training and achieve deliberate imitation.

In order to study the significance of the peel strength manifested by the adhesive layer in the present invention, the inventors created test pieces (samples) A, B by using adhesive interlining to bond 10 mm-wide, 15 cm-long, and roughly 3 mm-thick fiber monolayers in their dry, natural state before the wetting of the fibrous layers with the electroconductive viscous liquid to form strip-shaped two-layered fibrous structures, and measured the peel strength thereof using a 10 N-rated load cell.

FIG. 17 is a table of test and measurement results for the test pieces, constituted by a test piece A that comprises an adhesive interlining and is not saturated with the electroconductive viscous liquid, a test piece B that comprises an adhesive interlining and is saturated with the electroconductive viscous liquid, and a test piece C that is a single fibrous layer (no boundary layer).

A 50 mm section on one end of the test piece was a non-adhesive region in which no adhesive interlining was used in all of test pieces A, B, and C, and formed grip regions (chuck regions) for tensile tester grips.

The measurement system for the testing method was designed with reference to measurement systems typically used to measure tape peel strength. The spacing between the grips in the initial state was 20 mm. The chuck regions were 10 mm wide and 10 mm long, and had shapes matching the test pieces. Strain rate was set at 300 mm/min based on envisioned surgical dissection techniques. The chuck region was displaced 200 mm from the initial state, and the maximum load was taken as peel strength. Because peel strength increases proportionally to test piece width, the maximum load divided by width (N/cm) was taken as peel strength.

Figure 18:
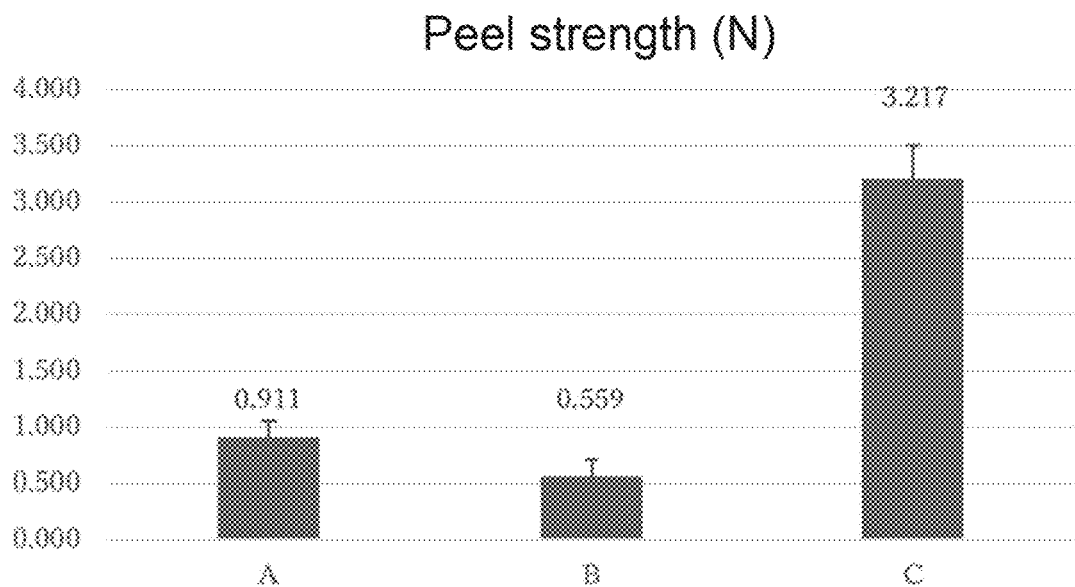
FIG. 18 is a graph comparing the peel strength of different test pieces.

Test results for peel strength measured in this way are shown in FIGS. 17 and 18.

Specifically, test piece A is a test piece in a "dry" state, bonded only by an adhesive interlining and not saturated with a viscous liquid. This arrangement resulted in a peel strength of 0.911 N with a standard deviation of 0.146 for A.

Test piece B is a test piece in which the fibrous structure bonded by the adhesive interlining is saturated with an electroconductive viscous liquid. Peel strength was 0.559 N with a standard deviation of 0.158 N, a significantly lower value than for test piece A, but stable peel strength was exhibited. This certain degree of reduction in peel strength is believed to be a result of the action of the water in the viscous liquid upon the adhesive interlining.

Test piece C shows test results for a fiber monolayer not using adhesive interlining. The peel strength for C was 3.217 N with a standard deviation of 0.290, clearly indicating stably higher peel strength than A and B, in which adhesive interlinings were used. These results for test piece C showed that a deliberately fragile dissection interface can be imitated by using adhesive interlining in the present invention.

In other words, the use of an adhesive interlining in the present invention makes it possible to imitate any level of peel strength within a region (range) equal to or less than the peel strength of the individual fiber layers making up the fibrous structure. The electroconductive viscous liquid imparts no structural strength to the organ model, but is strictly a fluid liquid used to impart electrical conductivity to the organ model. When the use of a viscous liquid reduces peel strength as in the tests described above, the adhesive strength of the adhesive interlining should be adjusted with this fact in mind.

(Function of Electroconductive Viscous Liquid)

In the present invention, a fibrous structure having a multi-layered structure comprising the adhesive layer 4 is ultimately impregnated with an electroconductive viscous liquid as part of the process of fabricating the fibrous structure, and the model is completed by filling the interior of the structure with the viscous liquid.

What is vital in the present invention is that the electroconductive viscous liquid is used not to bond the fibrous layers 2, 3, but strictly to impart wetness and electrical conductivity to the artificial organ model. In addition, because this wetness and electrical conductivity must be maintained for a certain length of time (for example, 5 minutes to 60 minutes) or longer during surgical technique training, the electroconductive viscous liquid must have a certain level of viscosity.

In other words, the electroconductive viscous liquid in the present invention is not used to model the target organ itself, unlike conventional models in which a hydrogel is hardened to eliminate fluidity and form the main structural component used to model the target organ itself. Indeed, although the electroconductive viscous liquid in the present embodiment is by definition viscous, the liquid will stick to the scalpel and interfere with surgical technique training if too viscous; thus, a fluid liquid, for example, one having a viscosity of 10,000 cP or less, is preferable. In other words, the viscous liquid in the present embodiment is better referred to as a sol, as the liquid must be fluid.

As used herein, the term "electroconductive viscous liquid" indicates a liquid that is electrically conductive as a result of the inclusion of an electrolyte or electroconductive particles in the liquid. The electroconductive viscous liquid in the present invention must have a certain degree of fluidity (viscosity) during training using the model of the present invention.

Test examples performed in order to determine a suitable viscosity range for the electroconductive viscous liquid used in the present invention will be described below.

Many polymer-containing viscous liquids, such as gels and sols, are non-Newtonian fluids characterized by having different measured viscosity values depending on measurement conditions. Therefore, the inventors of the present invention, in order to determine a suitable range for the organ model, measured viscosity at room temperature (17° C. to 20° C.) and a maximum measurement value of 500,000 cP according to the viscosity measurement method defined in JIS Z 8803:2011 (measuring at a rotational speed of 12 rpm using a Brookfield rotational viscometer and an LV-3 spindle) using a Brookfield viscometer, which is a single-cylinder rotational viscometer commonly used around the world to measure viscosity.

For the electroconductive viscous liquid, the water-absorbent polymer material sodium polyacrylate was used as the solute, and distilled water was used as the solvent.

Figure 19:
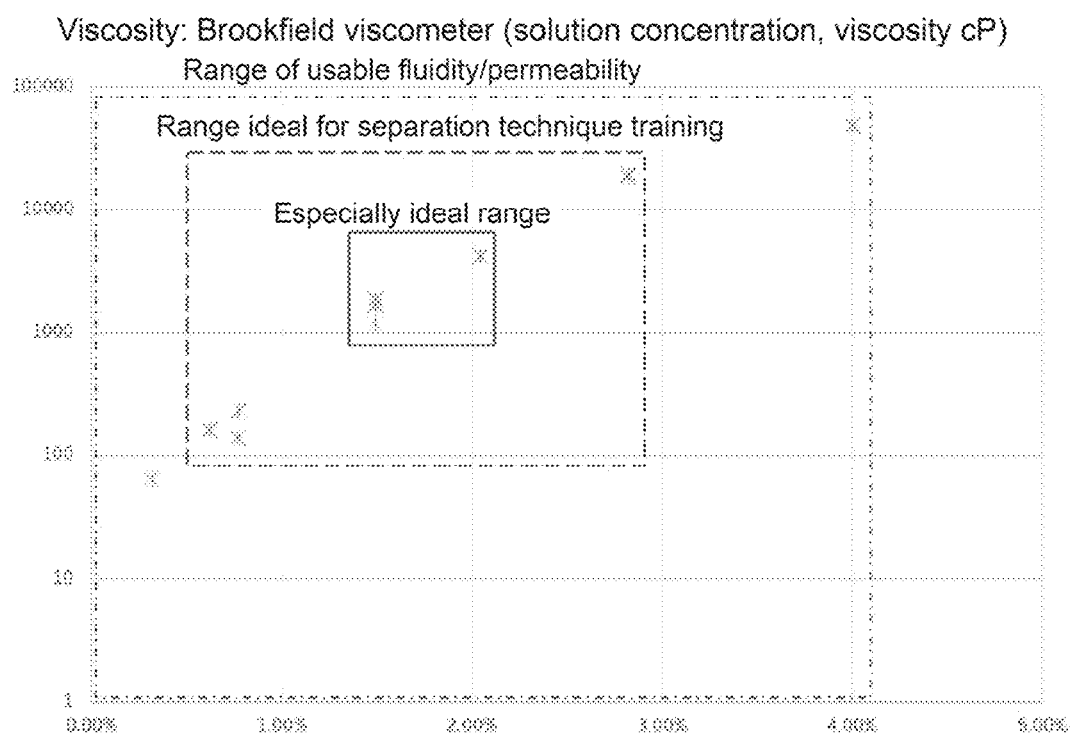
FIG. 19 is a graph of the distribution of the optimal viscosity of the electroconductive viscous liquid.

FIG. 19 shows the relationship between the weight concentration and viscosity of the electroconductive viscous liquid.

It has been discovered that the viscosity of the electroconductive viscous liquid is approximately exponential. The minimum value was 1 cP at a solution concentration of 0%, i.e., the viscosity of the distilled water alone, and the maximum value for the usable range in an organ model was 50,000 cP. In other words, 50,000 cP or less can be considered a sufficiently fluid level of viscosity. The range of 50,000 cP or less is sufficiently fluid, and belongs to the sol part of a continuous gel-sol state transition.

As a result of organ model evaluatory experiments performed by trained specialists in endoscopic surgery, it was determined that, within this range, a range of 140 cP to 20,000 cP is favorable for dissection technique training. In such cases, the weight concentration of the solution is in a range of 0.5% to 3.0%.

As the result of further thorough evaluatory experimentation, it was discovered that an especially ideal range for use in a dissection technique organ model was 900 cP to 5,000 cP for the sake of permeability, visibility of membrane tissues, tactile and visual imitativeness, etc.; in such cases, the weight concentration is in a range of 0.9% to 2.0%.

Electrical conductivity and the intrinsic fluidity of viscous liquids are essential elements of the electroconductive viscous liquid. "Fluidity" refers to the viscosity range in which the liquid is capable of saturating the fibrous structure and there is residual viscous liquid in the fibrous structure while performing dissection techniques.

"Electrical conductivity" means that there is no insulation between electrodes whether a monopolar or bipolar electric scalpel is used for dissection during surgical training; i.e., the liquid has a comparatively low electrical resistance value that allows conduction.

For these reasons, especially suitable viscous liquids include hydrosols, hydrogels, solutions containing electrolyte monomers as solutes, emulsions, and natural materials such as albumen and liquid mixtures of albumen and aqueous solutions of salts (for example, saline solution).

The electroconductive viscous liquid in the present invention is preferably uncolored, colorless, and as transparent as possible. This is because the saturation of the fibrous structure (fibrous layers 2, 3) with the viscous liquid imparts wetness to the fibrous structure, allowing a surgeon to visually and tactilely recognize the fibrous structure as human membrane tissue, and greatly improves the imitativeness thereof when dissection techniques are performed thereupon.

(Method of Use)

Figure 3:
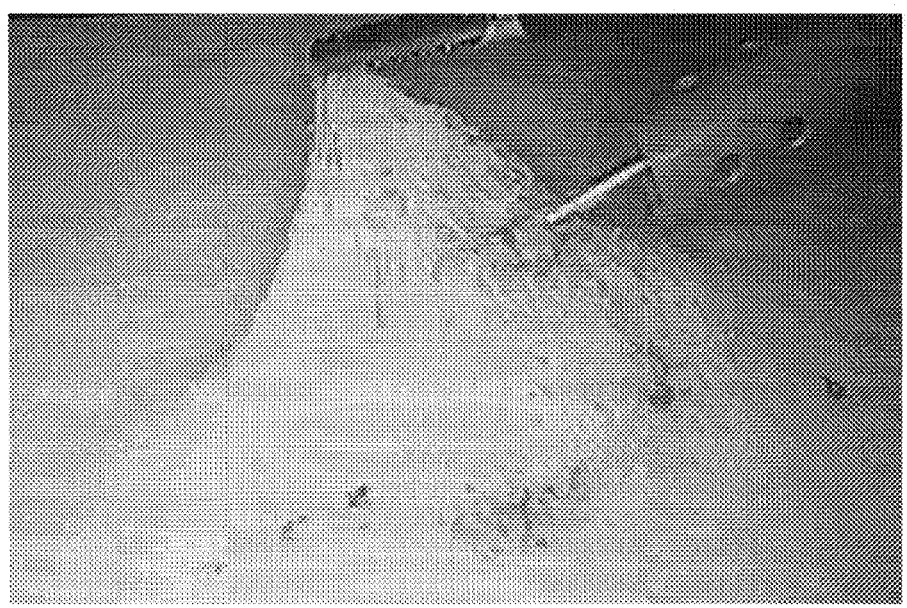
FIG. 3 is a photograph of surgical technique training using the artificial organ model.
Figure 4:
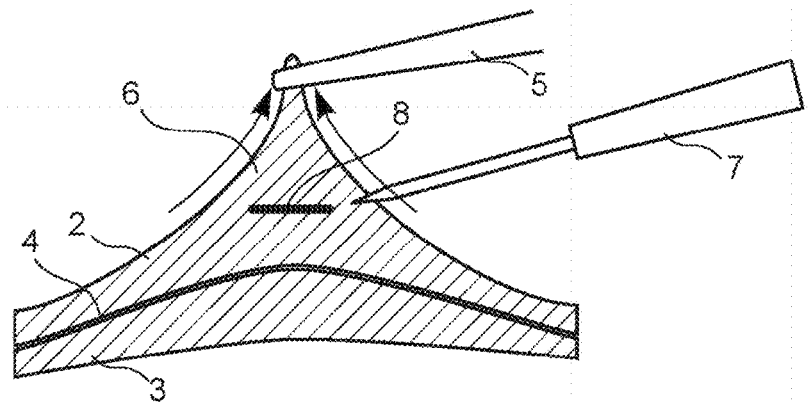
FIG. 4 is a schematic illustration of surgical technique training using the artificial organ model.
Figure 5:
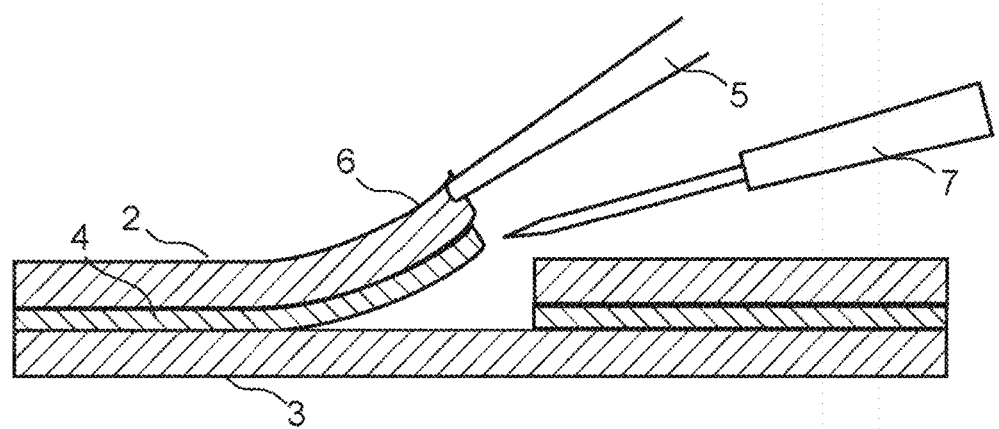
FIG. 5 is a schematic illustration of surgical technique training using the artificial organ model.

Next, a method of using the artificial organ model 1 will be described with reference to FIG. 3-5, using an example in which the organ is used for training in endoscopic dissection techniques.

In this case, an assistant (first user) first grasps and lifts the first fibrous layer 2 upward with tweezers 5. This places traction (countertraction) upon the first fibrous layer 2. As a result, multiple fibers positioned at the top in the layering direction are lifted up in a bundle. The longitudinal tensile strength of the fibers is greater than the bond strength thereof in the layering direction, i.e., the fibers are anisotropic to shear force; thus, the fibers are lifted upward to form a shape with a tent-like profile (the triangular shape indicated by 6 in FIGS. 3 and 4) as the gaps between the fibers increase.

In other words, the individual fibers in the arrangement according to the present invention have poor elasticity in the lengthwise direction and do not substantially stretch, as opposed to a conventional artificial organ model made of PVA, which would not exhibit localized deformation when grasped and lifted with the tweezers due to the model having a uniform elastic modulus in all direction; thus, the fibers form a considerably broad foot (the shape indicated by 6 in FIG. 4) when pulled upward at a single location, and deform into a triangular shape.

Next, a surgeon (second user) begins dissection by using an electric scalpel 7 (or a harmonic scalpel) to form an incision (indicated by 8 in FIG. 4) in the first fibrous layer 2 in the central part of the triangular raised part 6 with respect to the vertical direction. Care is taken during this process not to damage the second fibrous layer 3. If the saturated gel has poor electrical conductivity, electricity will not be conducted, and output must be increased to apply high voltage, thus burning the fibers. Therefore, an electro-conductive gel is necessary in order to ensure sufficient electrical conductivity.

One trick that the surgeon can use to perform dissection efficiently is to form an incision of a length that is, for example, about half the length of the bottom edge (see 8 in FIG. 4) in a single stroke.

The aspects to be mastered by the surgeon in this process are traction, dissection site, dissection length, and so forth. Poor mastery of these aspects will cause damage to the first and second fibrous layers 2, 3, resulting in poor technique.

Second Embodiment

Next, an example 1' in which a model organ is sandwiched within the basic dissection model 1 constituting the first embodiment will be described with reference to FIGS. 6-8 as an example that has been optimized for training in a specific surgical technique. In this example, an artificial organ model 1' in which an artificial blood vessel model 10 has been disposed for use in training in endoscopic vessel harvesting (EVH) will be presented.

Endoscopic vessel harvesting (EVH), the technique for which the artificial organ model 1' is used to train, is a method of harvesting grafts for CABG that is increasingly widely utilized, primarily in Western countries, because of its minimal invasiveness. However, this technique requires considerable experience to acquire suitable skill, and ineptly performed vessel harvesting increases damage to vessels and reduces vascular graft patency, and is also known to affect the patient's long-term prognosis; thus, this is an area in which it is greatly desirable to train on non-human models.

Figure 6:
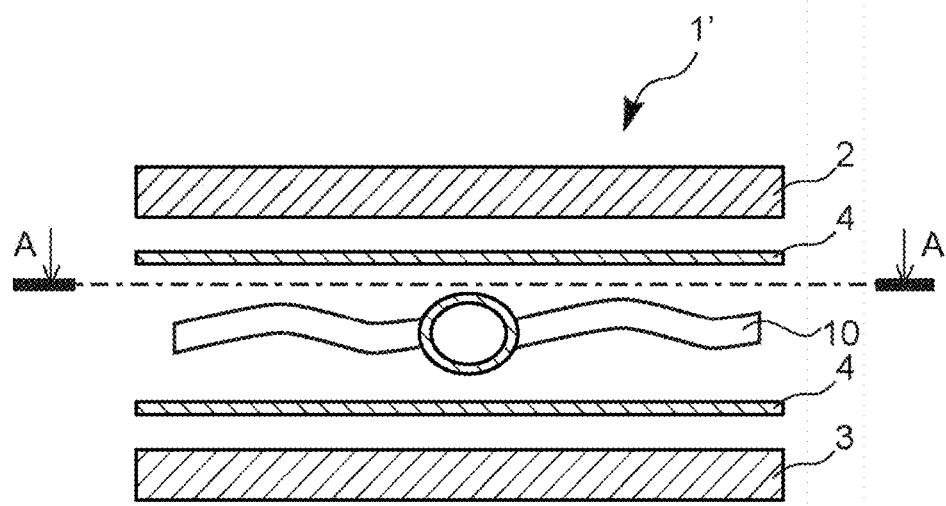
FIG. 6 is a schematic illustration of the configuration of an artificial organ model according to a second embodiment.
Figure 7:
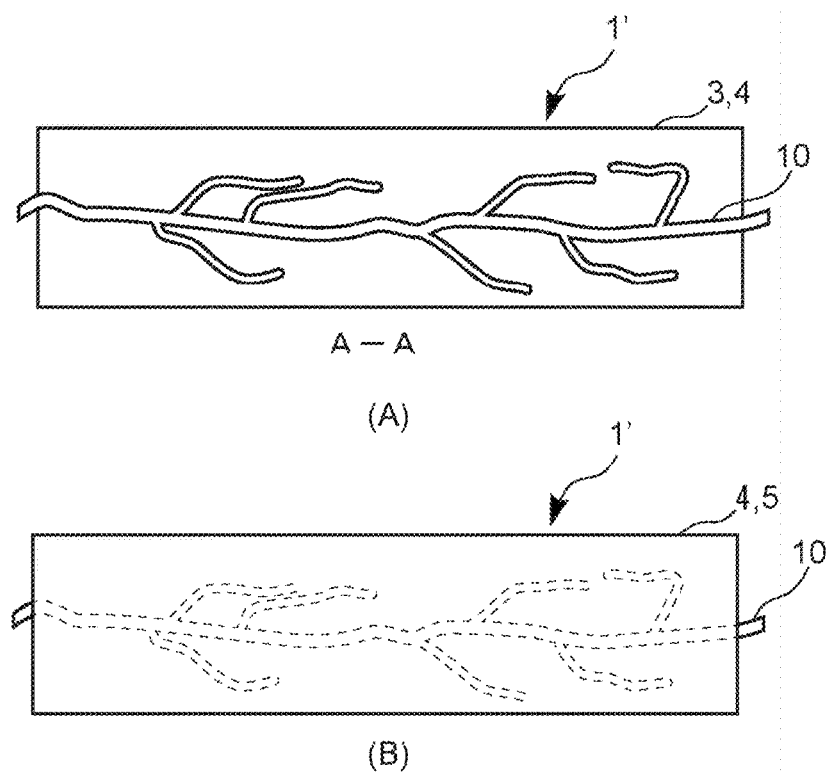
FIG. 7 shows a view along A-A in FIG. 6 and a plan view of the artificial organ model.
Figure 8:
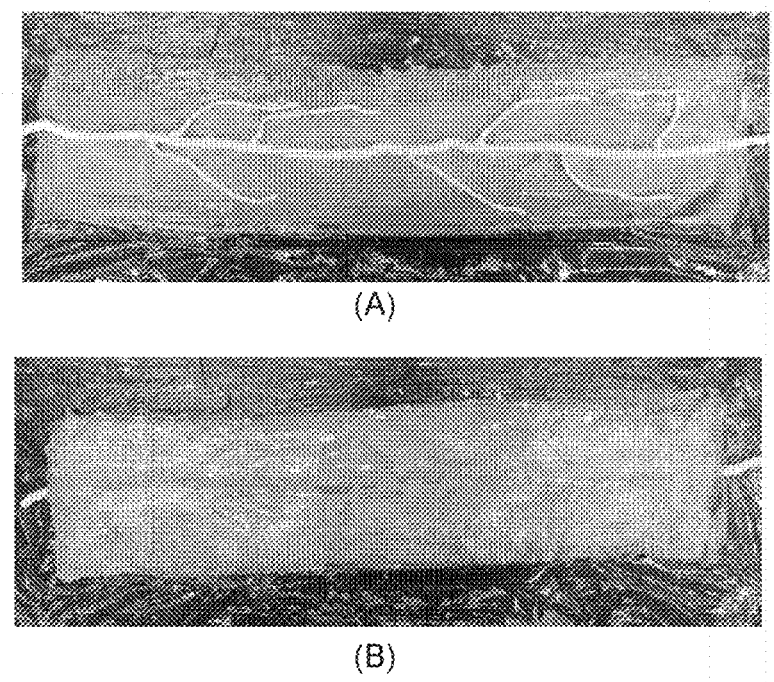
FIG. 8 is a photograph corresponding to FIG. 7.

FIG. 6 is a schematic illustration of the layers of the artificial organ model 1', FIG. 7(A) is a view along lines A-A in FIG. 6, and FIG. 7(B) is a plan view thereof. Elements similar to those in the basic artificial organ model 1 described above are labeled with the same numbers, and detailed description thereof will be omitted. FIG. 8 is a photograph of the artificial organ model 1' corresponding to FIG. 7.

In the artificial organ model 1', as shown in FIG. 6, an artificial blood vessel model 10 is disposed between the first and second fibrous layers 2, 3 and is compressed in the through-thickness direction and heated along with adhesive layers 4 disposed above and below to bond the layers, after which the whole is wetted with a liquid gel and solidified. This artificial organ model 1' can be used to train in techniques for gradually dissecting the blood vessel model 10 and the fibrous structures 2, 3 using an endoscopic scope.

Alternatively, a natural organ from an animal, rather than an artificial organ, can be disposed in the artificial organ model 1' instead of the artificial blood vessel 10. One conceivable example is to use a pig blood vessel to create a model of internal thoracic artery (ITA) dissection in coronary artery bypasses in the field of heart surgery.

Internal thoracic artery dissection is a surgical technique in which an electric scalpel or harmonic scalpel is used to harvest blood vessels for grafting. The internal thoracic artery has branches, which are ligated and cut away, and the main trunk is dissected and harvested.

This artificial organ model 1' can be used to train for procedures such as coronary artery bypass (CABG, OPCAB), endoscopic coronary artery bypass (MICS CAB), and robotic coronary artery bypass.

Third Embodiment

Figure 9:
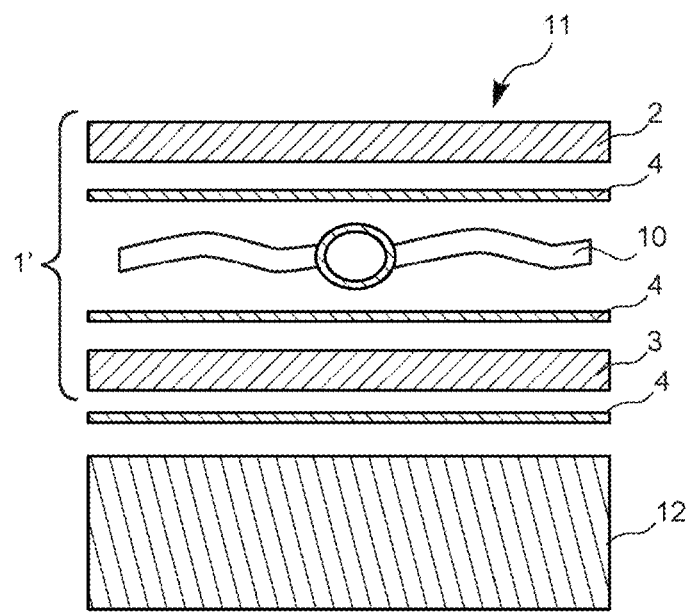
FIG. 9 is a schematic illustration of the configuration of an artificial organ model according to a third embodiment.
Figure 10:
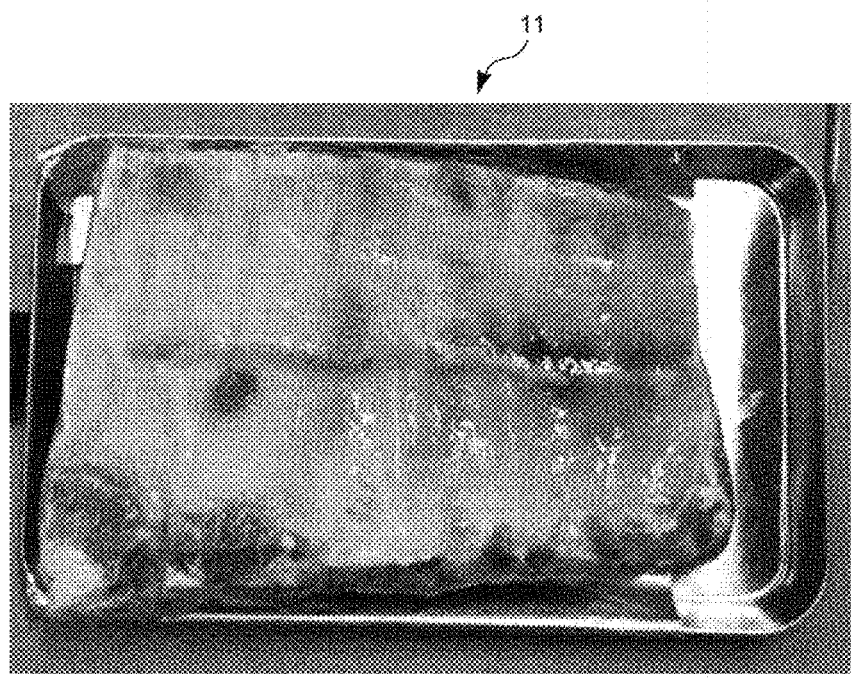
FIG. 10 is a photograph showing the external appearance of the artificial organ model.
Figure 11:
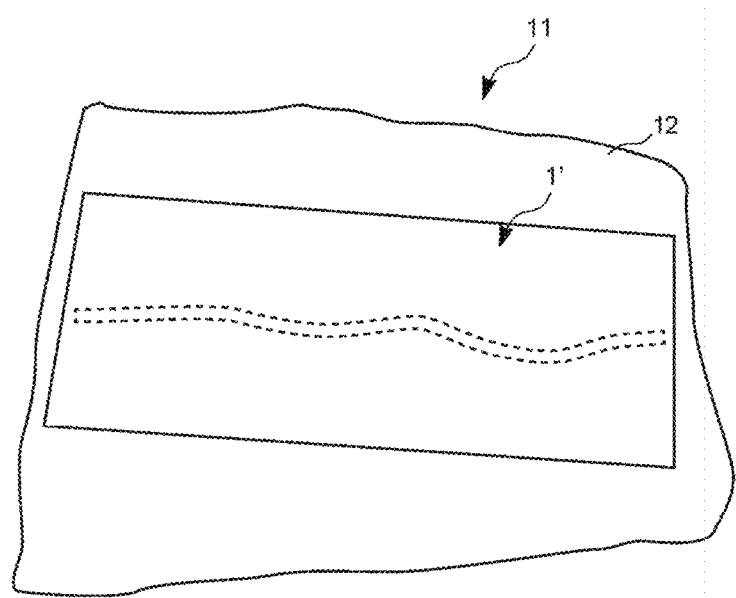
FIG. 11 is a schematic illustration corresponding to FIG. 10.

This embodiment is an example 11 in which the artificial organ model 1' according to the second embodiment described above is bonded to the surface of an actual animal organ 12, as shown in FIG. 9, in order to enhance the realism of surgical technique training. The preferred method of fabricating this model is to layer layers 2-4 and 10 on the surface of the animal organ 12 in the order shown in FIG. 9, followed by compressing and heating the whole, then wetting the whole with a liquid gel; however, the artificial organ model 1' completed in the second embodiment may also simply be bonded onto the animal organ 12. FIGS. 10 and 11 are external views of the artificial organ model 11.

Figure 12:
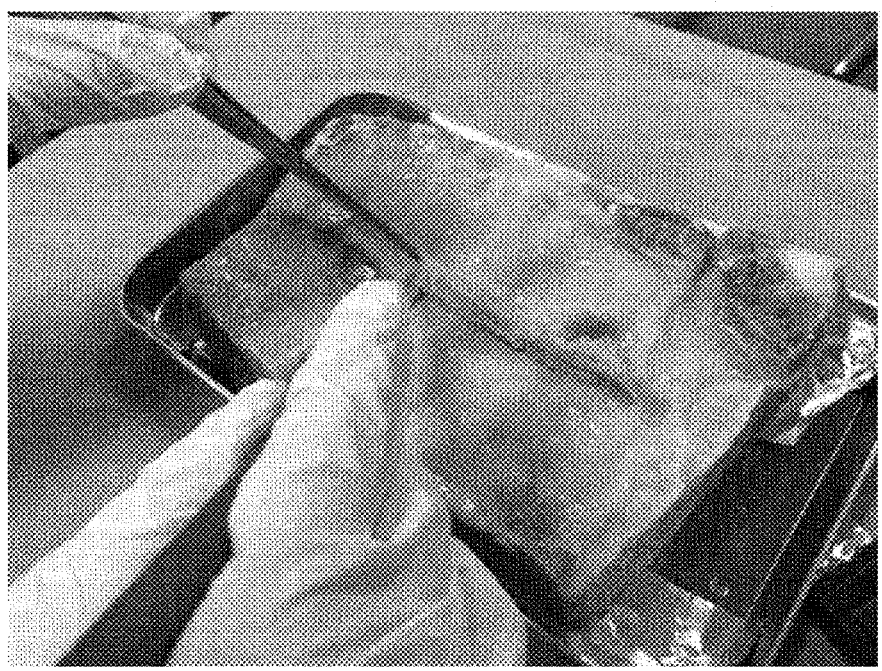
FIG. 12 is a photograph of surgical technique training.

FIG. 12 shows dissection by electric scalpel being performed upon the artificial organ model 11 by a heart surgeon as if upon the internal thoracic artery (ITA). Although it is not immediately apparent from this image, the layers are made visible by different colors, and traction is performed using the fibrous structure, thus resulting in effective training.

Fourth Embodiment

Figure 13:
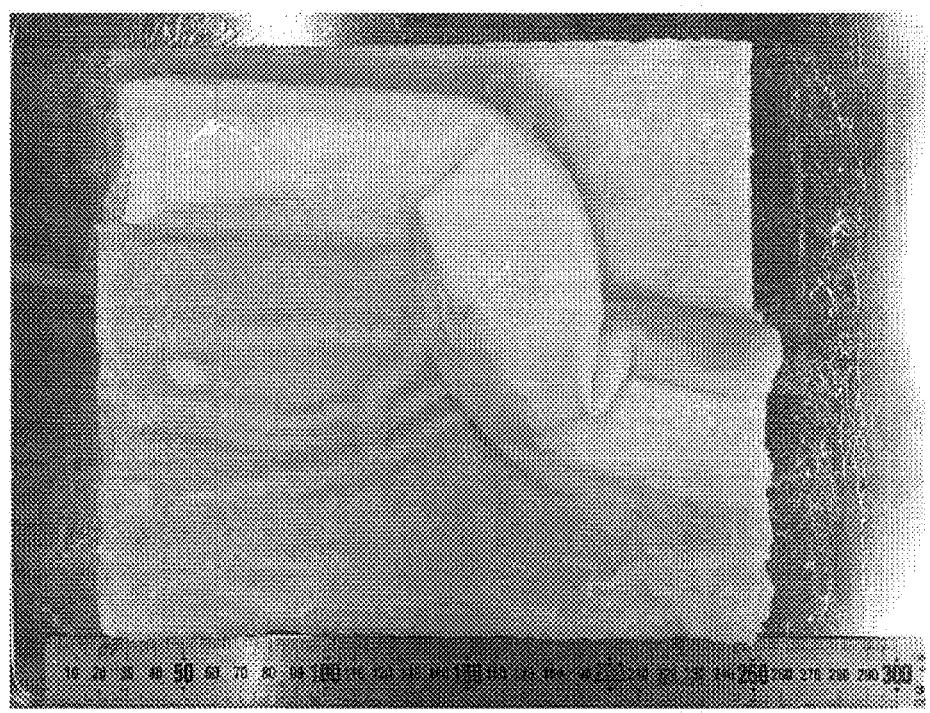
FIG. 13 is a photograph of an artificial organ model according to a fourth embodiment.
Figure 14:
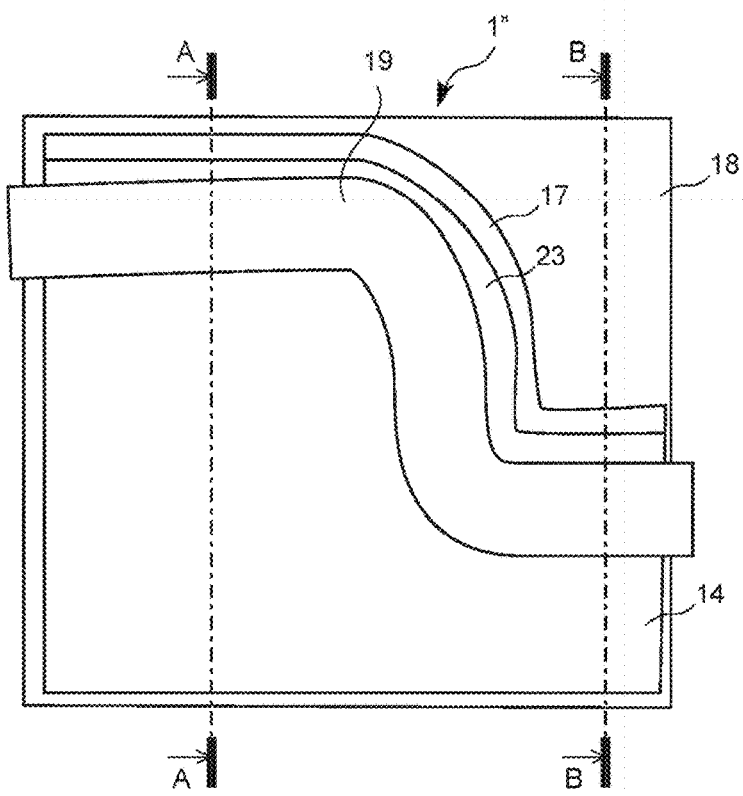
FIG. 14 is a schematic illustration corresponding to FIG. 13.

An artificial organ model 1" according to this embodiment, as shown in FIGS. 13 and 14, is an endoscopic sigmoid colon model obtained by building on the artificial organ models 1, 1' according to the first through third embodiments.

FIGS. 15 and 16 are cross-sectional views of the artificial organ model 1" along lines A-A and B-B, respectively, in FIG. 14. This example comprises five fibrous layers 14-18, with each of the layers 14-18 being colored differently from the adjacent layers and layered using adhesive layers not shown in the drawings.

A sigmoid colon 19, a ureter 20, blood vessels 21, a nerve 22, and other target organs for surgical training are disposed between the fibrous layers 14-18, as appropriate. These target model organs are targets that must not be damaged, are to be removed, must not be touched, etc., and are bonded to the fibrous layers 14-18 with a suitable level of strength. Label 23 in the drawings indicates a fat layer.

In the present invention, the plurality of fibrous layers may have different sizes or thicknesses, as seen in this fourth embodiment. Moreover, the fibrous layers need not necessarily be bonded to each other in their entireties, but may be partially bonded. In such cases, it is preferable to cut into suitable shapes according to the range to be covered by the adhesive layers.

(Fabrication Process for Fourth Embodiment)

Next, a specific process for fabrication the organ model according to the fourth embodiment described above will be described.

Figure 20:
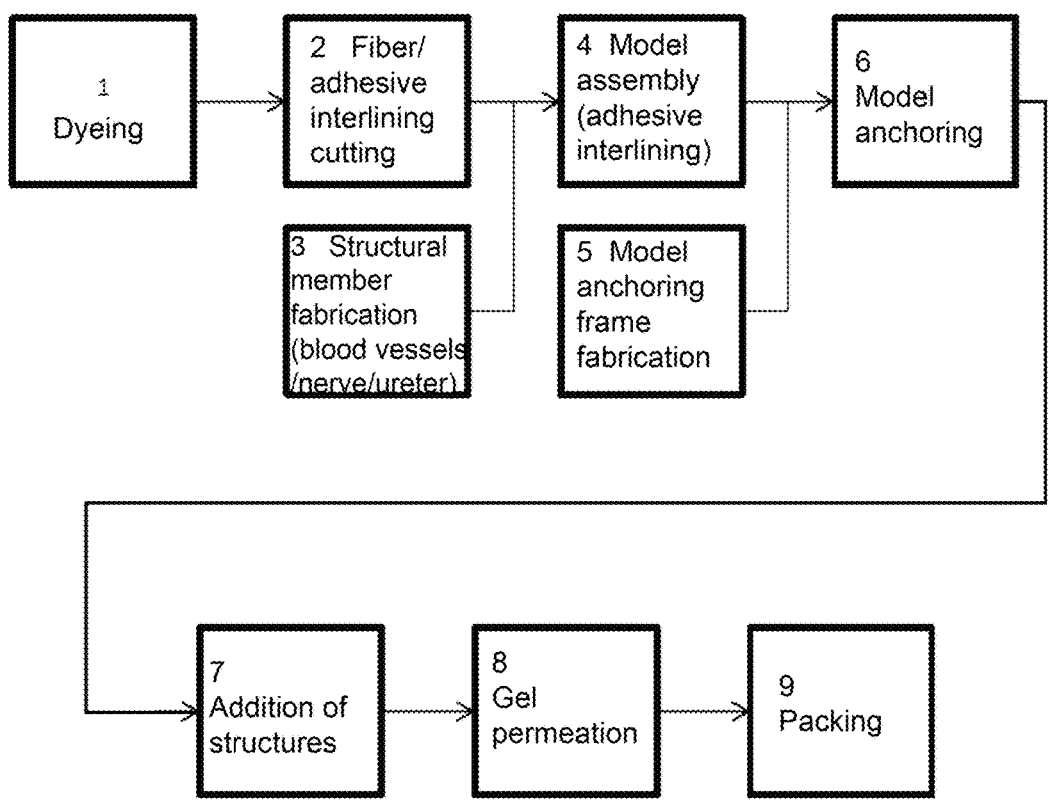
FIG. 20 is a diagram of a process of fabricating an artificial organ model according to a fourth example.

FIG. 20 is a flowchart of a specific fabrication process for the present embodiment.

The numbers in the rectangular boxes indicating the various steps indicate these steps, and correspond to the step numbers referred to hereinafter.

(1) Step 1: Fiber Dyeing

In step 1, fiber masses forming the fibrous layers 14-18 are colored in desired colors according to the layers represented by the fibrous layers 14-18. Specifically, this was performed by immersing the fibers in dye for a predetermined length of time as described below.

1) A container is filled with 7 L of 60° C. hot water, and dye for coloring is dissolved therein.

2) The fiber mass is introduced made to absorb the dye throughout the whole.

3) After about 15 minutes, the container is turned over, and left standing for another 15 minutes.

4) Finally, the fibers are rinsed with water to remove excess dye, and the fiber mass is dried completely.

(2) Step 2: Cutting Fibers and Adhesive Interlining to Desired Shape

In step 1, the fiber masses forming the fibrous layers 14-18 are cut to the desired shape according to the layers represented by the fibrous layers. Specifically, the fibers are cut by laser as described below.

1) Fibers 1 dyed yellow in the dyeing step, and fibers 2 and an adhesive interlining dyed pink in the same step, are cut by laser to fabricate parts for assembly.

2) The dimensions of undyed fibers 3, fibers 4, and adhesive interlining are measured, and cutting is performed using a roll cutter to fabricate parts for assembly.

Because the fibers and the adhesive interlining correspond on a 1-to-1 basis, the adhesive interlining is cut to the same shape as the fibers.

(3) Step 3: Target Organ Fabrication

In step 3, the surgical training target organs, such as the sigmoid colon, ureter, blood vessels, and nerve (corresponding to labels 19-22), are fabricated from silicone.

1) Molds for the various organs are prepared and filled with silicone to fabricate blood vessels (IMA, IMV, gonadal arteries/veins), a hypogastric nerve, and a ureter.

2) Next, nonwoven fabric is wrapped in a spiral around the fabricated organs, and treated to improve adhesion to the fibrous layers.

(4) Step 4: Organ Model Assembly

Figure 21:
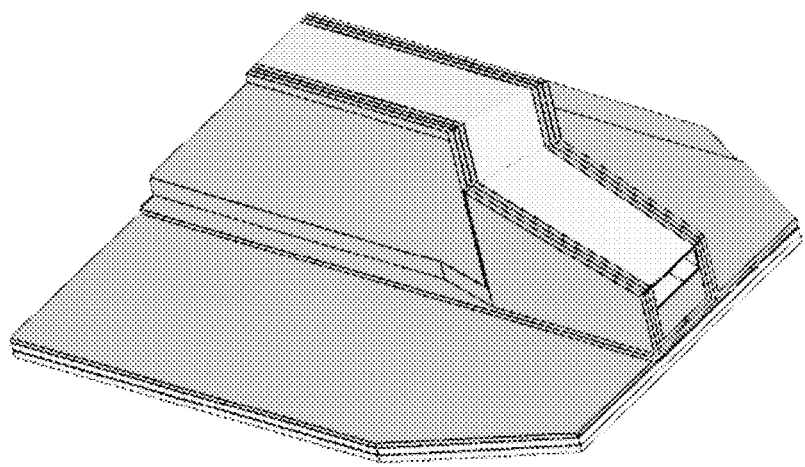
FIG. 21 is a perspective view of the artificial organ model in an assembled state.
Figure 22:
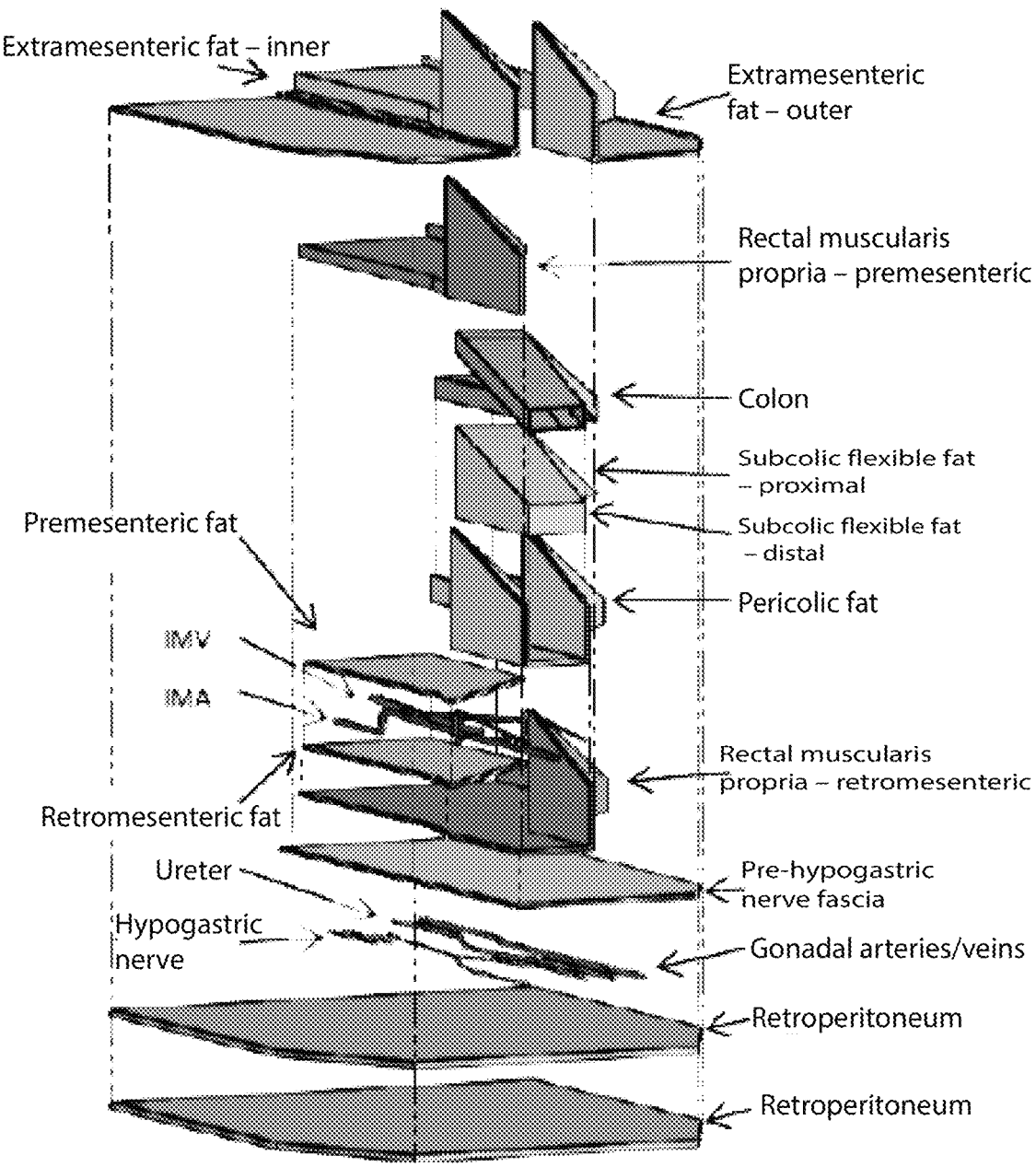
FIG. 22 is a schematic illustration of the assembly hierarchical structure of the artificial organ model.

In step 4, the fibrous layers 14-18 and target organs 19-22 fabricated as described above are bonded to each other, and the organ model is assembled as shown in FIGS. 21 and 22. Specifically, the following process is performed.

1) Identically-shaped parts for "colon" are layered and anchored using adhesive interlining.

2) "Pericolic fat" is partially sutured to "colon" using a sewing machine.

3) "Colon" is sewn into a tubular shape using a sewing machine.

4) "Subcolic flexible fat—proximal" and "subcolic flexible fat—distal" are anchored to the "colon" using adhesive interlining.

5) The ends of "blood vessel model (IMA)" are anchored by hand sewing to "subcolic flexible fat—distal" at multiple suturing positions.

6) "Pericolic fat" is anchored to "subcolic flexible fat" using adhesive interlining.

7) "Rectal muscularis propria—retromesenteric" is anchored to "pericolic fat" using adhesive interlining.

8) "Retromesenteric fat" is anchored to "rectal muscularis propria—retromesenteric" using adhesive interlining.

9) Holes through which the center of "blood vessel model (IMIA)" is passed are formed in "retromesenteric fat" and "rectal muscularis propria—retromesenteric", and the center of "blood vessel model (IMIA)" is passed therethrough.

10) "Blood vessel model (IMA)" and "blood vessel model (IMV)" are sandwiched between "mesentery anterior fat" and "retromesenteric fat", and anchored using adhesive interlining.

11) "Rectal muscularis propria—premesenteric" is placed over "retromesenteric fat" and "pericolic fat", and anchored using adhesive interlining. This complete the colon unit.

12) "Blood vessel model (gonadal arteries/veins)", "ureter", and "hypogastric nerve" are anchored by hand sewing to "retroperitoneum" at multiple suturing positions each.

13) The structure from 12) is sandwiched between "retroperitoneum" and "pre-hypogastric nerve fascia", and anchored using adhesive interlining.

14) Holes through which the center of the "blood vessel model (IMIA)" is passed are formed in "retroperitoneum" and "pre-hypogastric nerve fascia".

15) The colon unit completed in 11) is anchored to "pre-hypogastric nerve fascia" using adhesive interlining. At this time, the center of "blood vessel model (IMIA)" is passed through the holes formed in 14).

16) "Blood vessel model (IMA)" and "hypogastric nerve" are anchored by hand sewing (or stapling) to "retroperitoneum".

17) "Extramesenteric fat—outer" and "extramesenteric fat—inner" are anchored upon the colon unit using adhesive interlining.

18) Fibers of the same shape as "retroperitoneum" are anchored thereberneath using adhesive interlining.

19) The ends of "colon" are anchored by hand sewing to "retroperitoneum".

20) Structures (blood vessel model/ureter/hypogastric nerve) protruding from the model are trimmed.

As a result, it is possible to obtain a layered structure (organ model basic structure) such as shown in FIG. 21.

(5) Step 5: Model Anchoring Frame Fabrication Process

In step 5, an anchoring frame (FIGS. 23, 24) for three-dimensionally molding the layered structure obtained in step 4 is prepared.

1) First, stainless steel plain weave wire mesh is cut to 30 cm×40 cm.

Figure 24:
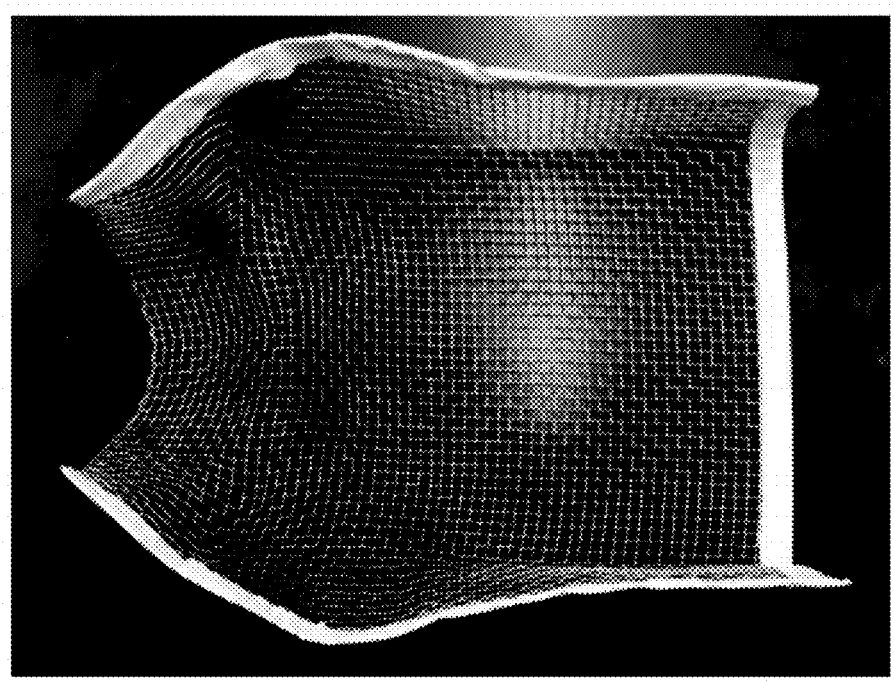
FIG. 24 is a photograph of an anchoring frame for the artificial organ model.

2) For safety, masking tape is applied to the cut edges (FIG. 24).

Figure 23:
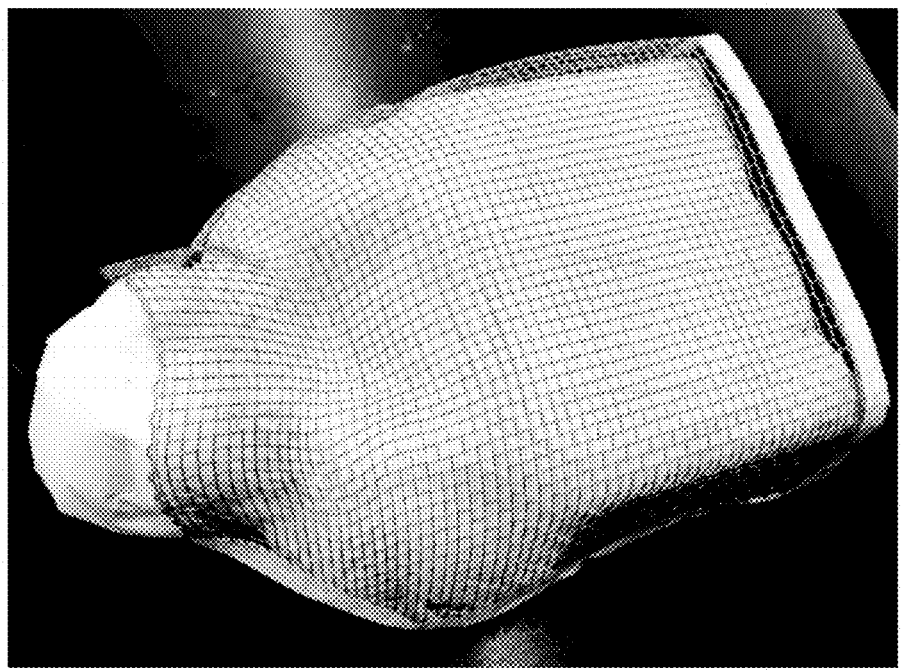
FIG. 23 is a photograph of an anchoring frame for the artificial organ model.

3) The wire mesh is shaped by being pressed against the interior cavity of a plaster model pelvis (FIG. 23).

(6) Step 6: Model Anchoring Process

In step 6, the organ model assembled in step 4 is anchored in the model anchoring frame prepared in step 5.

1) First, the organ model is placed against the wire mesh, and the positions to anchor are determined.

2) The anchoring locations are marked through the wire mesh with magic marker.

3) The model is removed from the wire mesh, and threads are tied at the marked locations.

4) The model is anchored to the wire mesh using the threads tied to the model.

5) Excess thread is trimmed.

(7) Step 7: Adding Organ

In step 7, a structure playing the role of the bladder is added above in the Z-axis direction of the rectum.

1) The fibers 2 are cut to about 15 cm×20 cm in size.

2) The fibers are hand sewn to the stainless steel plain weave wire mesh near the rectum.

(8) Step 8: Saturation with Electroconductive Viscous Liquid

In step 8, saturation with the electroconductive viscous liquid, the final step, is performed. The type of electroconductive viscous liquid may be selected according to purpose.

In this description, commonly-used viscous liquids were divided by type into step A and step B.

Step 8-1A: Viscous Liquid Mixing/Formulation Substep A (Hydrosol)

1A) First, a gelling agent (sodium polyacrylate) and glycerol are weighed out and mixed (solution A).

2A) Sodium bicarbonate and a sanitizing agent are mixed with tap water (solution B).

3A) Solution A is poured into solution B, and immediately stirred.

4A) The mixture is agitated and degassed in a centrifugal agitator/degasser.

Step 8-1B: Viscous Liquid Mixing/Formulation Substep B (Liquid Mixture of Natural Albumen and Saline Solution)

1B) Albumen is weighed out.

2B) 10 wt % saline solution is weighed out and prepared.

3B) The two are mixed at proportions of 5 parts 10 wt % saline solution to 10 parts albumen.

4B) The mixture is agitated and degassed in a centrifugal agitator/degasser.

Step 8-2: Pouring onto Sigmoid Colon Model, Rubbing in

5) The electroconductive viscous liquid obtained in step 8-1A or B is poured onto the sigmoid colon model, and rubbed into the fiber layers by hand or using a brush.

6) The model is preferably left standing in the viscous liquid overnight. The viscous liquid preferably has a viscosity of 1,210 cP after having been left standing. The viscosity can be set by adjusting the proportions of sodium polyacrylate, glycerol, sodium bicarbonate, and water; the preferred minimum and maximum viscosities in the present invention are the values stated above.

The sigmoid colon model according to the fourth embodiment is thus completed.

In the present embodiment, the electroconductive viscous liquid must be a fluid sol, and, conversely, must not be a solid gel that has loss fluidity.

The electroconductive viscous liquids of steps 8-1A and 8-1B are both defined as hydrosols; this is proven by filter paper permeation experiments.

For example, the subject electroconductive viscous liquid is placed on filter paper, such as a coffee filter, and left to stand. The viscous liquid used in the present embodiment was successfully confirmed to have permeated the filter within a few minutes. This is indicative of the ability of the liquid to saturate the fibrous structure that is the main structure of the model. Meanwhile, it was confirmed that gels, such as hydrogels, organogels, and alcogels, that do not permeate filter paper are not preferable as the electroconductive viscous liquid used in the present embodiment.

(9) Step 9: Packaging Completed Organ Model

Figure 25:
FIG. 25 is a photograph of the artificial organ model in a finished state.

In step 9, the artificial organ model completed in step 8 by being wetted with the electroconductive viscous liquid is sealed in plastic wrap as shown in FIG. 25 to keep the viscous liquid from drying out or solidifying.

1) The gel-saturated model is wrapped in plastic wrap. Alternatively, the model may be vacuum packed.

2) The wrapped (or vacuum packed) model is sealed in a plastic bag.

3) The model is placed in a closed container box to prevent leakage of the electroconductive viscous liquid and deformation of the wire mesh. This effectively prevents desiccation and solidification.

As a result, seepage, vaporization, and desiccation of the electroconductive viscous liquid are prevented, and the desired wet state is maintained.

Figure 26:
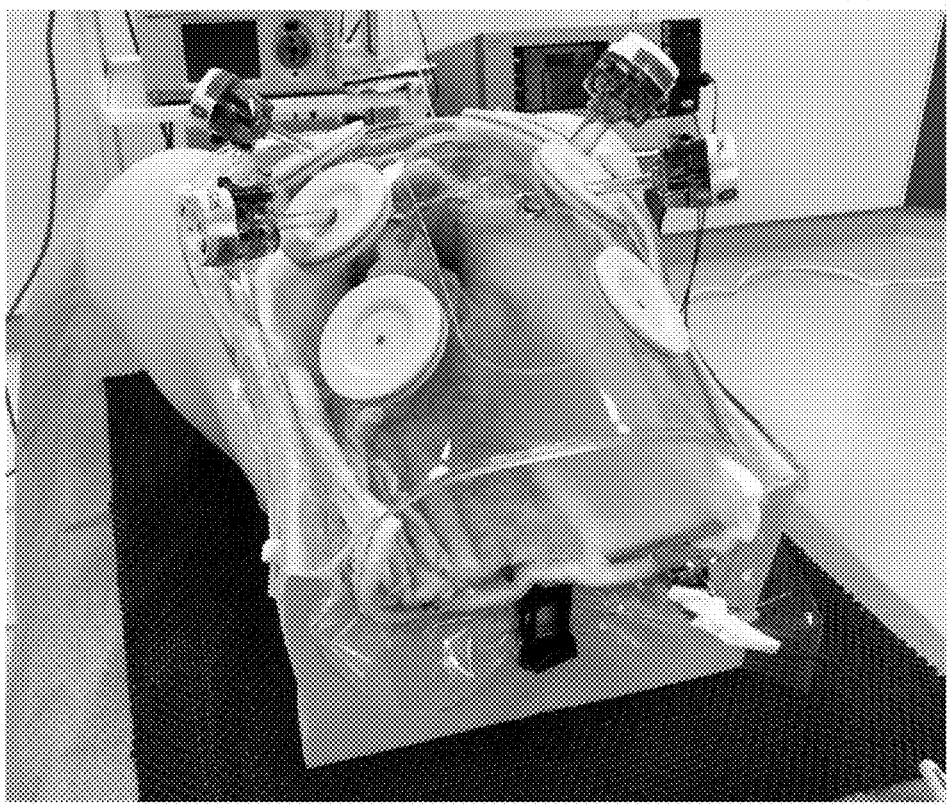
FIG. 26 is a photograph of a mode for using the artificial organ model.

FIG. 26 illustrates a manner of using the artificial organ model thus fabricated.

To use the artificial organ model, the model is removed from the container box, and unsealed by removing the plastic bag and wrap. This unsealing is preferably performed immediately before beginning surgical technique training. This will ensure that the wetness and electrical conductivity provided by the electroconductive viscous liquid lasts for a certain length of time (for example, 5 minutes to 60 minutes) or longer during surgical technique training.

The present invention is not limited to the embodiments described above, and various modifications may of course be made thereto to the extent that they do not depart from the gist of the invention.

For example, the adhesive layer is not limited to being the adhesive interlining in the one embodiment described above. The layer may be formed from another material so long as it is porous. Alternatively, the fibrous layers may be directly bonded to each other with adhesive as long as the permeation of the electroconductive viscous liquid is not impeded thereby.

DESCRIPTION OF THE REFERENCE NUMBERS

1: Artificial organ model
2: First fibrous layer
3: Second fibrous layer
4: Adhesive layer
5: Forceps (tweezers)
6: Triangular section
7: Electric scalpel
10: Model artificial blood vessel model
11: Artificial organ model according to third embodiment
12: Animal organ
14-18: Fibrous layer
19: Sigmoid colon
20: Ureter
21: Blood vessel
22: Nerve

The invention claimed is:

1. A method of fabricating an artificial organ model for surgical separation technique training, the method comprising:
   a step of preparing two or more dry fibrous layers;
   a step of layering the two or more dry fibrous layers and directly bonding the layers to each other, the bonding having a level of strength that enables separation thereof by a surgical separation technique performed by a surgical technique trainee;
   and a step of supplying an electroconductive liquid, liquid sol, or liquid gel to the bonded two or more dry fibrous layers, and saturating therewith the dry fibrous layers and an interior thereof.

2. The fabrication method according to claim 1, further comprising a step of forming two adjacent dry fibrous layers out of the two or more dry fibrous layers from different materials or substances or in different colors so as to be recognizable as different membranes by the surgical technique trainee.

3. The fabrication method according to claim 1, wherein the step of layering the two or more dry fibrous layers and bonding the layers to each other comprises:
   a step of interposing a sheet-like adhesive layer between the two or more dry fibrous layers when layering the dry fibrous layers; and
   a step of heating the layered two or more dry fibrous layers to bond the dry fibrous layers to each other.

4. The fabrication method according to claim 1, further comprising a step of disposing a model organ for surgical technique training between two selected dry fibrous layers out of the two or more dry fibrous layers.

5. The fabrication method according to claim 4, wherein the model organ is an artificial model organ formed from an artificial material.

6. The fabrication method according to claim 4, wherein the model organ has been harvested from an animal.

7. The fabrication method according to claim 4, wherein the model organ is one or more of a ureter, a blood vessel, an intestine, or a nerve.

8. The fabrication method according to claim 1, wherein the dry fibrous layers are bonded to each other using thermoplastic resin.

9. The fabrication method according to claim 1, wherein the bonding of the dry fibrous layers is performed by layering and using a selected one or multiple thin-film sheets impregnated or coated with thermoplastic resin or adhesive.

10. The fabrication method according to claim 1, further comprising a step of bonding the artificial organ model to a surface of a predetermined model organ.

11. The fabrication method according to claim 1, further comprising a step of sealing in the dry fibrous layers that have been saturated with the electroconductive liquid, liquid sol, or liquid gel.

* * * * *